Sept. 5, 1967  K. R. HALES  3,340,162
PITCH TOLERANCE COMPENSATOR FOR A JET-ELECTROLYTIC
TREATMENT APPARATUS
Filed Jan. 27, 1964  2 Sheets-Sheet 1

INVENTOR.
KENNETH R. HALES
BY
ATTORNEY

Sept. 5, 1967  K. R. HALES  3,340,162
PITCH TOLERANCE COMPENSATOR FOR A JET-ELECTROLYTIC
TREATMENT APPARATUS
Filed Jan. 27, 1964  2 Sheets-Sheet 2

INVENTOR.
KENNETH R. HALES
BY
ATTORNEY

United States Patent Office 3,340,162
Patented Sept. 5, 1967

3,340,162
PITCH TOLERANCE COMPENSATOR FOR A JET-ELECTROLYTIC TREATMENT APPARATUS
Kenneth R. Hales, Colmar, Pa., assignor to Philco-Ford Corporation, a corporation of Delaware
Filed Jan. 27, 1964, Ser. No. 340,451
2 Claims. (Cl. 204—28)

ABSTRACT OF THE DISCLOSURE

Apparatus for compensating for pitch variation between chain-linked components undergoing jet-electrolytic treatment on a processing wheel, consisting of a plurality of outwardly biased drive pins translatable along a fixed radial path and carried by said wheel for rotation therewith, and automatically adjustable to the pitch spacing between successive components to maintain such components on a fixed radial path.

---

This invention relates to an improved method of and apparatus for automatically compensating for variation in pitch tolerance of strip-fed stock undergoing machine handling.

While of broader application, the invention will be described in connection with its use in the electrochemical processing art and more particularly in connection with the jet-electrolytic treatment of continuously moving, strip-fed parts. The concepts of the invention are of particular utility in the jet-electrolytic treatment of small contact elements and electrical terminations.

The term "strip-fed" as used in the specification and claims is to be given a content of wider import than merely referring to interconnected parts punched from a ribbon of metal. The term is used to refer to parts which have been arranged to have a uniform spacing whether that spacing results from a previous punching operation or, for example, is the result of using a separate fixture into which such parts are placed preparatory to treatment. The essential criteria is that the parts to be treated be capable of machine handling in a form which is equivalent to a continuous chain of components, although the parts themselves might be physically distinct. If the parts are substantially uniformly spaced and present, in essence, a "chain" of components, the parts are herein characterized as "strip-fed."

It is desirable, and often necessary, to the proper functioning of electrical terminations and contacts, to plate certain wear areas with a heavy deposit of metal. In the prior art it has been the practice to plate the entire surface of the part, or alternatively manually to mask off portions not requiring plating. Both of these procedures have their disadvantages. The first approach is wasteful of material and the second is excessively time consuming. Moreover, certain applications require the deposition of exceedingly heavy deposits of metal which requirement cannot be achieved in an economic manner using present processing techniques.

In avoidance of these problems there has been developed in the prior art apparatus for the continuous jet-electrolytic treatment of a moving chain of parts, using a rotatable treatment wheel onto which the chain of components is fed for synchronous transport therewith. During transport the treatment means, and components undergoing treatment, are thus fixed relative to each other. The desired residence time for treatment is achieved by controlling the speed of traverse. One example of such apparatus is that disclosed in copending application, Ser. No. 142,843, filed Oct. 4, 1961, entitled Jet Electrolitic Treating Apparatus now issued as Patent No. 3,137,645 and assigned to the assignee of the instant invention.

Briefly described, that apparatus comprises a plurality of floating treatment sectors each controlling the position of one or more jet-forming orifices. Each of these sectors is constructed and arranged to be independently and circumferentially movable about a predetermined mean position in response to the position of the chain of parts undergoing treatment whereby the jet-forming nozzles of each sector are brought into precise registration with successive incremental portions of the chain for synchronized movement therewith throughout the chain's traverse of the treatment wheel.

The material to be treated is desirably transported in such manner as to constitute a chain of components having a predictable and preferably uniform spacing between individual elements. Portions of the chain are aligned with individual jet-forming orifices of a sector, by use of an indexing tab carried by the sector, and transported in synchronism therewith, around the plating wheel. Thus there is provided apparatus for the jet-electrolytic treatment of a constantly moving chain of components by a continuous fabricating process.

While apparatus of this nature has been found generally to provide satisfactory operation, problems have arisen, as for example, in the handling of a continuous chain of strip-fed components blanked from sheet-metal stock wherein tolerance variations tend to be cumulative and unidirectional. In such instances the uninterrupted flow of components may result in the sector assuming a maximum tolerance position after which further tolerance accumulation results in impairment of the component chain.

It is a further difficulty of such apparatus that the chain during its traverse of the wheel undergoes distortion as a result of localized drive. This can occur, for example, when only one of the above-mentioned indexing tabs provides the motive power for chain transport, resulting in jet misalignment and faulty plating.

It is accordingly an object of the instant invention to provide a method of operation and apparatus which avoids the aforementioned and other deficiencies of the prior art.

It is a further object of the invention to provide a method of operation, and apparatus for its practice, which automatically compensates for pitch variation of wheel-treated strip stock, insuring both distortionless drive and precise alignment of component parts of the chain with the treatment means throughout traverse of the wheel.

These and other objects within contemplation will be more readily understood by reference to the accompanying detailed description and drawing of which;

The invention in its apparatus aspects comprises the provision of mechanism which automatically and continuously provides for compensation of pitch variation between successive chain-linked components by adjustment of the pitch diameter of incremental portions of the chain preliminary to its traverse of the treatment portion of the wheel. The method concept of the invention, on which construction of the apparatus is premised, is that if the pitch or distance between successive components, of a chain of arcuately moving components is regarded as a function of the diameter of the chain, then variation in pitch may be compensated for by predetermined control of the effective diameter of the treatment wheel. Moreover, pitch compensation can be effected while maintaing the components on fixed radial paths.

The invention, as portrayed in the illustrated embodiment, comprises the application of that principle to the solution of the problem of maintaining precise registration—within predetermined pitch tolerance limits—between components of a moving chain of components and individual treatment jets comprising a treatment wheel, with which said components are constrained to move in synchronism.

In accomplishment of this purpose, radially-translatable means are provided in the form of an expandable sprocket wheel which automatically provides for compensation of pitch variations between successive chain-linked components, by adjustment of the effective diameter of the drive associated with the treatment wheel. The term pitch as used herein means the distance between components comprising the chain. Since pitch is treated as diameter-dependent, variation in pitch between successive components may be off-set, while still maintaining alignment of individual components along a given radial path, by compensatory variation of the diameter of the treatment wheel.

By adjusting the diameter of the arc of traverse of the chain in its travel around the treatment wheel, the components, regardless of variation in pitch, may be maintained aligned along fixed radial paths. Pitch variation can thus be compensated for by positioning the treatment means to perform its treatment function in a direction radially of said wheel, totally nullifying pitch variation. To facilitate machine-sensing of pitch variation, means are provided as, for example, indexing holes punched in the connecting web between components, correlated with pitch spacing.

Sensing elements operatively associated with the indexing holes are provided which mechanically convert the information relating to pitch spacing into the appropriate traversing diameter required by that spacing to insure alignment of the components along a predetermined radial path.

Figure 1:
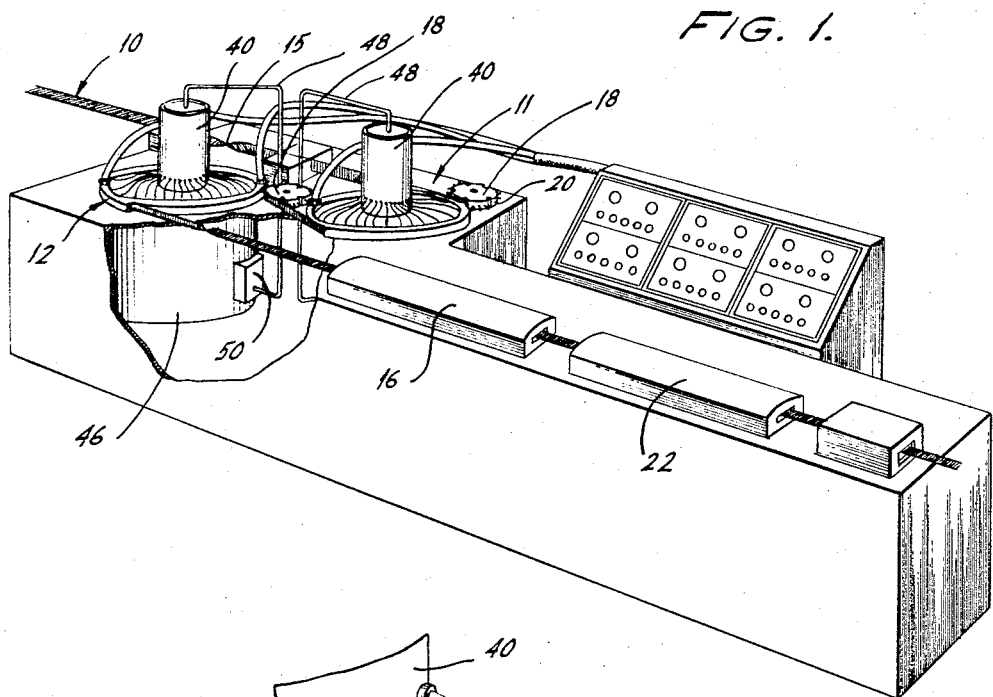
FIGURE 1 is a perspective view of one form of apparatus embodying the present invention.

As seen in FIGURE 1, the chain or strip of components 10 to be treated is successively fed over sprocketed treatment wheels 11 and 12. The pitch compensating or indexing pins 13 (FIGURE 2), the constructional details of which can be seen in FIGURE 3, form the adjustable sprocket teeth of these wheels. Each indexing pin is spring biased and arranged to engage a strip perforation 14 at every fifth component location. Two wheels are required in the illustrated application in order to provide plating on opposite faces of the part undergoing treatment. The strip prior to being fed through the plating wheel is given a 90° twist, at location 15, to facilitate wrapping around the wheels. The strip undergoes a 90° restoring twist prior to entering rinse station 16. To insure engagement of the strip with the indexing pins 13, a perforated idler wheel 18 is employed. This wheel has a series of pins 20 arrayed around its perimeter which engage the strip perforations, the body of the wheel acting to seat the strip against the treatment wheel and onto the indexing pins 13. The wheel 18 is recessed, as shown, at every fifth location, to accommodate the wheel indexing pin 13. This arrangement provides positive registration between the chain perforations and sprocket teeth and insures their initial alignment. On completion of the residence time required for treatment, the part is transported out of the plating station, rinsed in chamber 16 and dried under hood 22.

Figure 2:
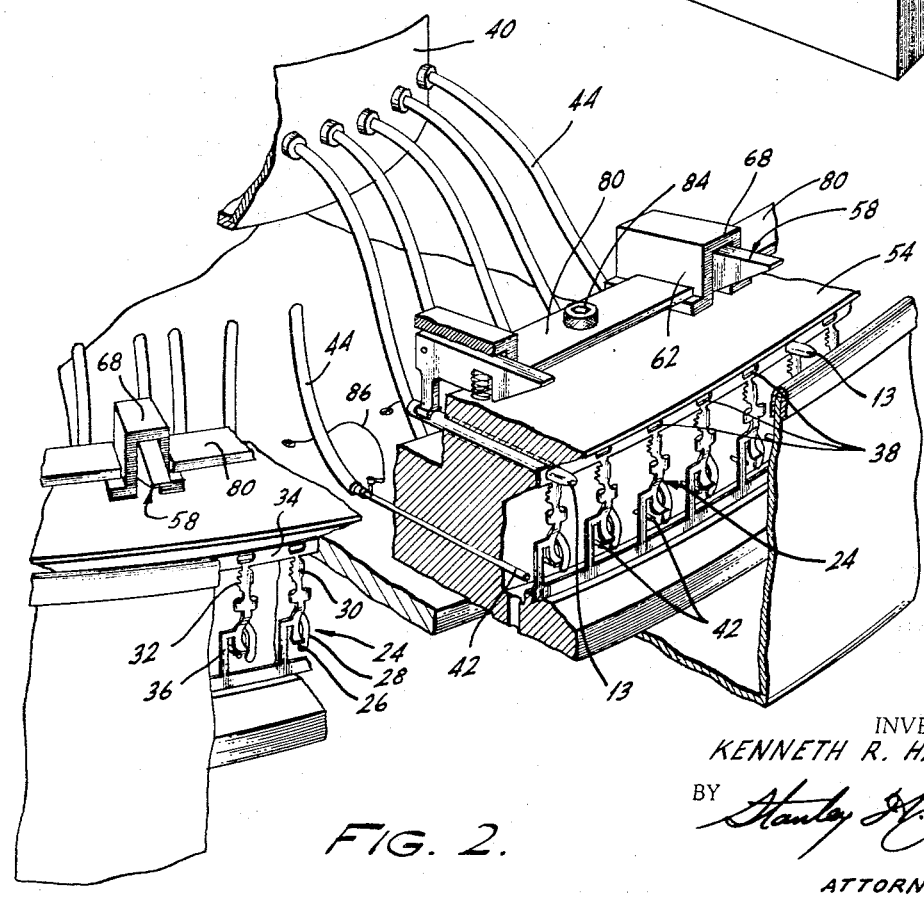
FIGURE 2 is a fragmentary perspective illustration showing details of the plating apparatus and depicting a section of the treatment wheel and pitch-compensating mechanism comprising one aspect of the instant invention.

The treatment apparatus is modified in accordance with the specific application for which it is to be used, the machine illustrated being designed for the continuous jet plating of terminations 24 of the type shown in FIGURE 2. These terminations are normally stamped out of brass or phosphor bronze and are shown formed as a continuous chain of components. The terminations consist of a pair of finger-like depending members 26 and 28 and an upper shank portion 30 formed with a series of wire-wrapping lugs or segments 32. The balance of the component assembly consists of the strip stock from which the part was punched and comprises the web or tie 34 interconnecting successive terminations and the inverted L-shaped support member 36 which lends the necessary rigidity to the punched assembly during strip feed. The indexing perforations 38 are punched in the connecting web at each connector location. The spacing between perforations for all practical purposes, is equivalent to the spacing between components.

Terminations 24 are designed for low voltage application. In such applications in order to achieve ohmic contact between engaging surfaces, it is desirable to plate the area of contact with an inert metal such as gold. Although silver is superior in electrical and thermal conductivity, and can be employed in various other applications, it is generally not used in applications of the type described since it readily oxidizes, forming a rectifying barrier region between contacting surfaces which can only be disrupted by high voltage gradients.

One formulation of electrolyte used to produce the desired gold deposit consists of a dilute alkaline solution of potassium gold cyanide ($KAu(Cn)_2$) having a basicity of approximately pH 11. The required plating pressure of one p.s.i. is obtained by means of the hydrostatic head developed in reservoir 40, the plating solution being supplied to each of the jet-forming tubes 42 by individual hose connections 44. During operation, the plating solution is continuously recirculated. Unused electrolyte is drained to a reclaiming tank 46 (FIGURE 1) from where it is returned through pipes 48 to reservoir 40 by conventional pump means 50. If desired, a filter may be installed in the return conduit.

To deposit a .030 mil thick coating of gold requires the part to be maintained under the plating jets for about 3 seconds at a plating potential of from 20–24 volts.

In order to make the process economically feasible, a considerable number of contacts must undergo plating substantially simultaneously. This presents a problem of considerable magnitude when using stamped terminations inasmuch as the tolerance variation between individual stampings, when accumulated, can be sufficient to cause jet misalignment.

Figure 3:
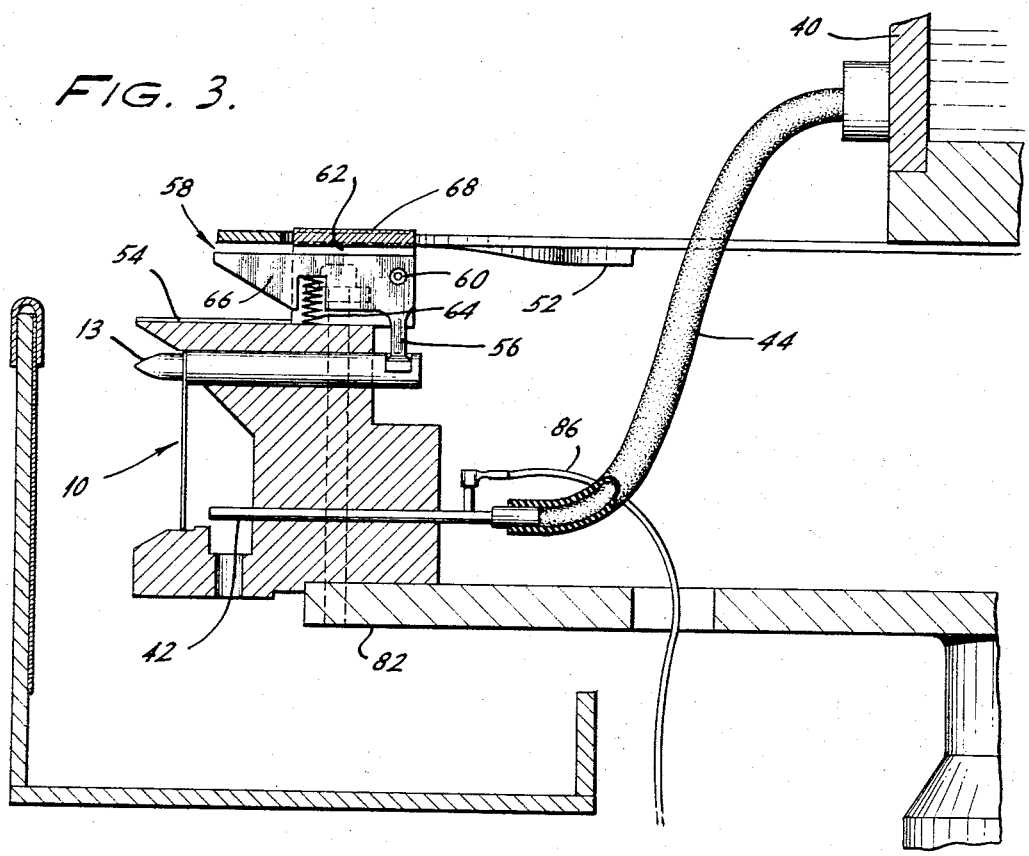
FIGURE 3 is a sectional elevational view showing constructional details of the pitch-compesating mechanism shown in perspective relief in FIGURE 2.

In avoidance of this problem, each of the indexing pins 13 is designed to accommodate, through radial travel, within a prescribed range, pitch variation within a given tolerance limit. In the illustrated embodiment, constructional details are given for a system designed to accommodate a ±2 mil pitch variation between components. In the construction shown the pins are arranged so that immediately prior to completion of a treatment run they are returned to their fully retracted position by cam means 52 (FIGURE 3). The pins are retained in their fully retracted position until they are carried by the wheel into re-engagement with another segment of the chain as it feeds onto the treatment wheel. Immediately following re-engagement the pins are released from cam control and permitted to seek a radial location corresponding to a pitch diameter dictated by the pitch dimensions of the components comprising that segment of the chain. The extent of radial movement of the indexing pin is automatically controlled by chain tension. If, for example, the components comprising a given section of chain exhibit a plus tolerance condition, the pins associated with that segment of the chain do not experience any radial restraint until the chain is brought taut between adjacent pins. If one thinks of the chain as analogous to a flexible link or rope the operation can be readily visualized.

The structural features comprising the indexing pin assembly are seen in FIGURE 3. The pin 13 is conveniently housed within the insulative wheel annulus 54. The pin is radially positioned within the annulus and adapted for translation by the depending arm 56 of a bell-crank structure 58 pivotly carried at 60 within the flanged yoke 62. The pin 13 is resiliently urged into its fully extended position by spring 64 acting on the forward arm 66 of bell crank assembly 58. The lintel 68 of yoke 62 delimits the swing of the bell crank controlling the stroke of indexing pin 13.

In the embodiment illustrated, the compression spring is designed to exert a force sufficient to place the chain in tension. This loading forces each pin to seek a radial position dependent on the chain tension which it encounters, which in turn, as previously explained, is a function of pitch spacing. In the case of components having a minimum tolerance spacing, the pins, on being released from cam control, are restrained against motion by the chain tension which they encounter and hence are retained in their fully retracted position.

Figure 4:
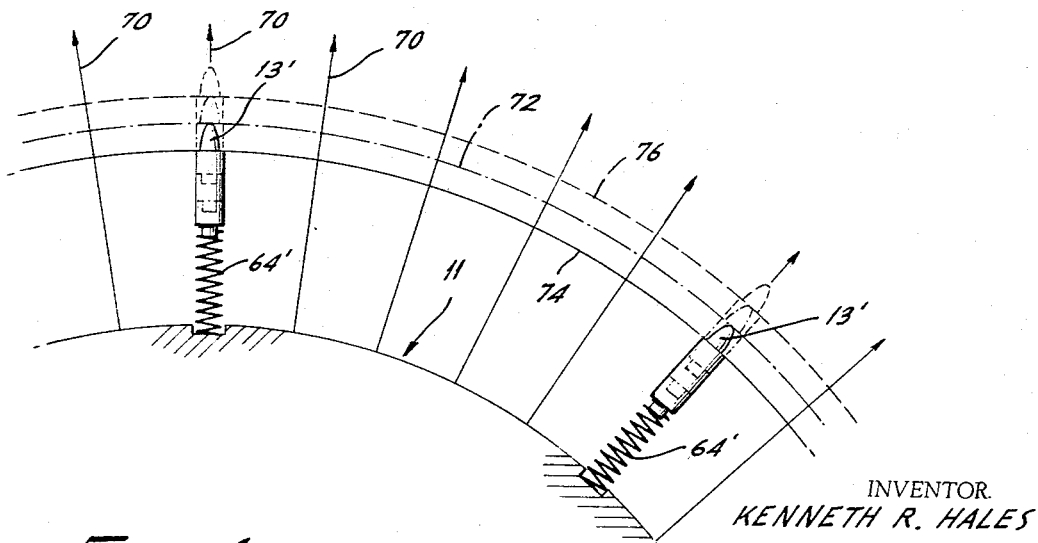
FIGURE 4 is an illustration graphically depicting the theory of operation underlying the invention.

As diagrammatically shown in FIGURE 4, the indexing pins 13, automatically and individually translate into positions corresponding to the pitch diameter required by a given pitch spacing. By aligning the treatment jets, represented by the arrow-tipped lines 70, along paths radially of the treatment wheel 11, precise indexing between the jets and components may be maintained for any pitch variation within design limits.

This arrangement can readily handle unidirectional tolerance build up, a condition which, as previously mentioned, characteristically occurs in the treatment of long chains of components stamped from strip stock. Since the sprocket wheel defined by the indexing pins 13 is expansible, wheel diameter can be varied to accommodate variation in pitch spacing without tolerance buildup.

The action of the indexing pins 13, as depicted in FIGURE 4, graphically illustrates how pitch compensation is effected while maintaining the individual connectors comprising the chain aligned with the radial trajectory of the treatment jets. The mean and extreme positions of the component chain are shown respectively by the dot and dash line 72, full line 74, and dot and dash line representation 76.

As previously noted, the pitch compensators, or indexing pins 13, are arranged to engage the connector chain at each fifth connector location. As seen in FIGURE 2, the bell crank assemblies 58 are mounted at spaced intervals along the upper surface of the wheel annulus 54 and are mounted to the annulus by clamp plates 80. This arrangement permits convenient access to the units and facilitates both their maintenance and repair.

By securing the plates 80 to the frame 82 of the unit by bolt means 84 (FIGURE 3), the indexing pins 13 are electrically connected to ground. The jet-forming tubes 42 are individually seated, within the insulative annulus 34 to permit the maintenance of the desired plating potential between the plating jets and connector chain. The jets are electrified by wiring 86 maintained in electrical communication with a suitable power source, not shown, by means of a conventional brush-commutator arrangement.

The above described preferred form of apparatus permits continuous and automatic jet-electrolytic treatment—including both etching and plating processes—of a chain of moving parts, by an arrangement which achieves both precise localized treatment of the individual parts comprising the chain and is productive of an end product wherein each part receives substantially identical treatment regardless of tolerance variation.

It should also be understood that the broader method and apparatus aspects of this invention have application outside the electroplating field. For example, the principles of the invention could with equal efficacy be used in the radial drilling of strip-fed stock to insure proper bit alignment.

While a preferred form of the present invention has been depicted and described, it will be understood by those skilled in the art that the invention is susceptible of changes and modifications without departing from the essential concepts thereof, and that such changes and modifications are contemplated as come within the terms of the appended claims.

I claim:

1. The method of aligning components of a strip-fed chain of components with rotating jet-electrolytic treatment means, which comprises:
    (a) translating successive incremental portions of said chain along a path in confronting relation with that defined by said treatment means and in synchronized transport therewith,
    (b) producing through use of said means a radially-directed jet of electrolyte, and
    (c) adjusting the diameter of traverse of an incremental portion of said chain in accordance with the pitch spacing of components comprising said incremental portion through use of spring-biased drive pins translatable along a fixed radial path to align at least one of said components with said radially-directed jet of electrolyte.

2. In apparatus for the continuous jet-electrolytic treatment of strip-fed components, the combination comprising:
    (a) a rotatable treatment wheel, including
    (b) treatment means constructed and arranged to carry out the treatment function in a direction radial of said wheel,
    (c) indexing means correlated with the pitch spacing of said components,
    (d) a plurality of spring biased drive elements translatable along a fixed radial path disposed at spaced intervals around the perimeter of said wheel, rotatable therewith, and adapted for translation into cooperative engagement with individual ones of said indexing means automatically to establish a traversing radius of curvature for successive incremental portions of said strip in accordance with the pitch spacing between components comprising said incremental portions, whereby to maintain components of variable pitch in fixed radial alignment with associated treatment means during traverse of said wheel by said components.

References Cited

UNITED STATES PATENTS

| 1,898,141 | 2/1933 | Piper | 226—81 |
| 2,432,967 | 12/1947 | Johnson | 197—133 |
| 2,556,930 | 6/1951 | Miller | 95—75 |
| 2,601,790 | 7/1952 | Magnusson | 75—244 |
| 2,913,093 | 11/1959 | Bevan | 197—133 |
| 3,137,645 | 6/1964 | Vaughan et al. | 204—206 |

FOREIGN PATENTS

| 955,408 | 1/1957 | Germany. |
| 800,576 | 8/1958 | Great Britain. |

JOHN H. MACK, *Primary Examiner.*

W. VAN SISE, *Assistant Examiner.*